(12) United States Patent
Chen

(10) Patent No.: US 9,330,281 B2
(45) Date of Patent: May 3, 2016

(54) METHOD FOR PERFORMING CODING RESOURCE MANAGEMENT, AND ASSOCIATED PROCESSING CIRCUIT

(75) Inventor: Chuan Chen, Leshan (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 1168 days.

(21) Appl. No.: 12/997,610

(22) PCT Filed: Sep. 19, 2010

(86) PCT No.: PCT/CN2010/077096
§ 371 (c)(1),
(2), (4) Date: Dec. 13, 2010

(87) PCT Pub. No.: WO2012/034292
PCT Pub. Date: Mar. 22, 2012

(65) Prior Publication Data
US 2012/0068873 A1 Mar. 22, 2012

(51) Int. Cl.
*G06F 21/79* (2013.01)
*G06F 17/30* (2006.01)
*G06F 11/10* (2006.01)

(52) U.S. Cl.
CPC ............ *G06F 21/79* (2013.01); *G06F 11/1012* (2013.01); *G06F 17/30598* (2013.01); *G06F 2221/2153* (2013.01)

(58) Field of Classification Search
CPC ..... G08C 17/02; G11B 27/36; G06F 11/3636
USPC .............................. 340/173; 360/53; 717/128
See application file for complete search history.

(56) References Cited

U.S. PATENT DOCUMENTS

| | | | | |
|---|---|---|---|---|
| 6,469,633 B1* | 10/2002 | Wachter | | 340/4.37 |
| 6,754,018 B2* | 6/2004 | Takahashi | | 360/53 |
| 7,301,961 B1* | 11/2007 | James et al. | | 370/464 |
| 7,590,973 B1 | 9/2009 | Barry | | |
| 8,042,084 B1* | 10/2011 | Janneck et al. | | 716/117 |
| 2002/0071559 A1* | 6/2002 | Christensen et al. | | 380/277 |
| 2002/0073282 A1* | 6/2002 | Chauvel et al. | | 711/122 |
| 2002/0078348 A1* | 6/2002 | Leung et al. | | 713/164 |
| 2002/0080044 A1* | 6/2002 | Kang et al. | | 340/825.69 |
| 2003/0140337 A1* | 7/2003 | Aubury | | 717/158 |
| 2007/0124618 A1* | 5/2007 | Aguilar et al. | | 713/322 |
| 2011/0246171 A1* | 10/2011 | Cleeton et al. | | 703/25 |

FOREIGN PATENT DOCUMENTS

| | | |
|---|---|---|
| CN | 1221187 A | 6/1999 |
| CN | 101763265 A | 6/2010 |

OTHER PUBLICATIONS

International application No. PCT/CN2010/077096, International filing date: Sep. 19, 2010, International Searching Report mailing date: Jun. 30, 2011.

* cited by examiner

*Primary Examiner* — Mohamed Barakat
(74) *Attorney, Agent, or Firm* — Winston Hsu; Scott Margo

(57) ABSTRACT

A method for performing coding resource management is provided, where the method is applied to a processing circuit. The method includes: with regard to a specific coding operation, selecting a specific module from a hardware module and a program module; and performing the specific coding operation by utilizing the specific module. In particular, the step of selecting the specific module from the hardware module and the program module further includes: based upon at least one characteristic of the specific coding operation, default settings, and/or user settings, selecting the specific module from the hardware module and the program module. An associated processing circuit is also provided.

18 Claims, 5 Drawing Sheets

METHOD FOR PERFORMING CODING RESOURCE MANAGEMENT, AND ASSOCIATED PROCESSING CIRCUIT

TECHNICAL FIELD

The present invention relates to control architecture of different coding resources, and more particularly, to a method for performing coding resource management, and to an associated processing circuit.

BACKGROUND

According to the related art, when it is required for a conventional electronic device to perform data coding (e.g. data encoding and/or data decoding), the conventional electronic device typically utilizes only a kind of coding resource to obtain coding results (e.g. encoded results and/or decoded results). For example, the conventional electronic device merely utilizes a specialized hardware resource (such as an encoder/decoder), rather than a processor executing a program module, to obtain encoded/decoded results. In another example, the conventional electronic device merely utilizes a processor executing a program module (such as an encoding/decoding module), rather than a specialized hardware resource, to obtain encoded/decoded results.

Please note that whether the conventional electronic device should utilize the hardware resource or the processor executing the program module to obtain encoded/decoded results is typically determined in a design phase of the conventional electronic device. However, some problems may occur when a user is using the conventional electronic device. For example, it seems unlikely that utilizing the hardware resource can always achieve the best performance of obtaining the encoded/decoded results, where the performance of obtaining the encoded/decoded results may vary in different situations. As a result, achieving the best overall performance of the conventional electronic device can hardly be guaranteed since which kind of coding resource (e.g. the hardware resource, or the processor executing the program module) should be utilized for obtaining coding results such as the encoded/decoded results mentioned above has been determined in the design phase without any chance to change. Thus, a novel method is required for implementing control architecture of different coding resources.

SUMMARY

It is therefore an objective of the claimed invention to provide a method for performing coding resource management, and to provide an associated processing circuit, in order to solve the above-mentioned problems.

An exemplary embodiment of a method for performing coding resource management is provided, where the method is applied to a processing circuit. The method comprises: with regard to a specific coding operation, selecting a specific module from a hardware module and a program module; and performing the specific coding operation by utilizing the specific module. In particular, the step of selecting the specific module from the hardware module and the program module further comprises: based upon at least one characteristic of the specific coding operation, default settings, and/or user settings, selecting the specific module from the hardware module and the program module.

An exemplary embodiment of an associated processing circuit comprises at least one hardware module and a resource manager. The at least one hardware module is arranged to perform at least one coding operation when needed. In addition, the resource manager is arranged to perform coding resource management, wherein with regard to a specific coding operation, the resource manager selects a specific module from the hardware module and a program module. Additionally, the processing circuit performs the specific coding operation by utilizing the specific module. In particular, based upon at least one characteristic of the specific coding operation, default settings, and/or user settings, the resource manager selects the specific module from the hardware module and the program module.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
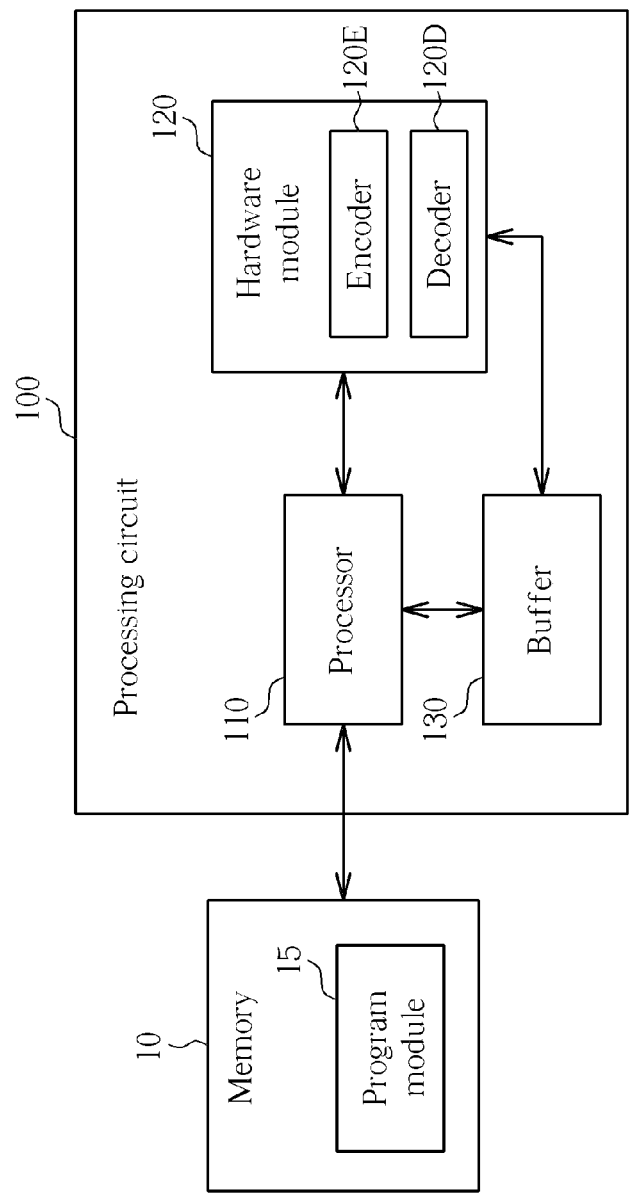
FIG. 1A is a diagram of a processing circuit coupled to a storage such as a memory according to a first embodiment of the present invention.

Please refer to FIG. 1A, which illustrates a diagram of a processing circuit 100 coupled to a storage such as a memory 10 according to a first embodiment of the present invention, where the memory 10 stores at least one program module 15 such as at least one coding procedure. For example, the memory 10 can be a read only memory (ROM) such as an electrically erasable programmable ROM (EEPROM), and the aforementioned at least one coding procedure may comprise an encoding procedure and/or a decoding procedure. The processing circuit 100 comprises a resource manager such as a processor 110, at least one hardware module such as the hardware module 120, and a buffer 130, where the hardware module 120 may comprise an encoder and/or a decoder, such as an encoder 120E and a decoder 120D. In this embodiment, the aforementioned resource manager is the processor 110 arranged to control operations of the processing circuit

100. This is for illustrative purposes only, and is not meant to be a limitation of the present invention. According to a variation of this embodiment, the aforementioned resource manager can be an individual component, rather than the processor arranged to control operations of the processing circuit of this variation.

In this embodiment, the aforementioned resource manager such as the processor 110 is arranged to perform coding resource management, and the aforementioned at least one hardware module such as the hardware module 120 is arranged to perform at least one coding operation when needed, where the buffer 130 is utilized for buffering data such as data of one or more coding operations. In addition, with regard to a specific coding operation, the resource manager (e.g. the processor 110 in this embodiment) can select a specific module from the hardware module 120 and the program module 15. Thus, the processing circuit 100 performs the specific coding operation by utilizing the specific module, i.e. the specific module selected by the resource manager.

Please note that the processing circuit 100 can obtain the program module 15 from the aforementioned storage (e.g. the memory 10) outside the processing circuit 100. This is for illustrative purposes only, and is not meant to be a limitation of the present invention. According to a variation of this embodiment, the processing circuit 100 may comprise a memory arranged to store the program module 15. For example, the memory arranged to store the program module 15 in this variation can be a ROM such as an EEPROM.

Figure 1B:
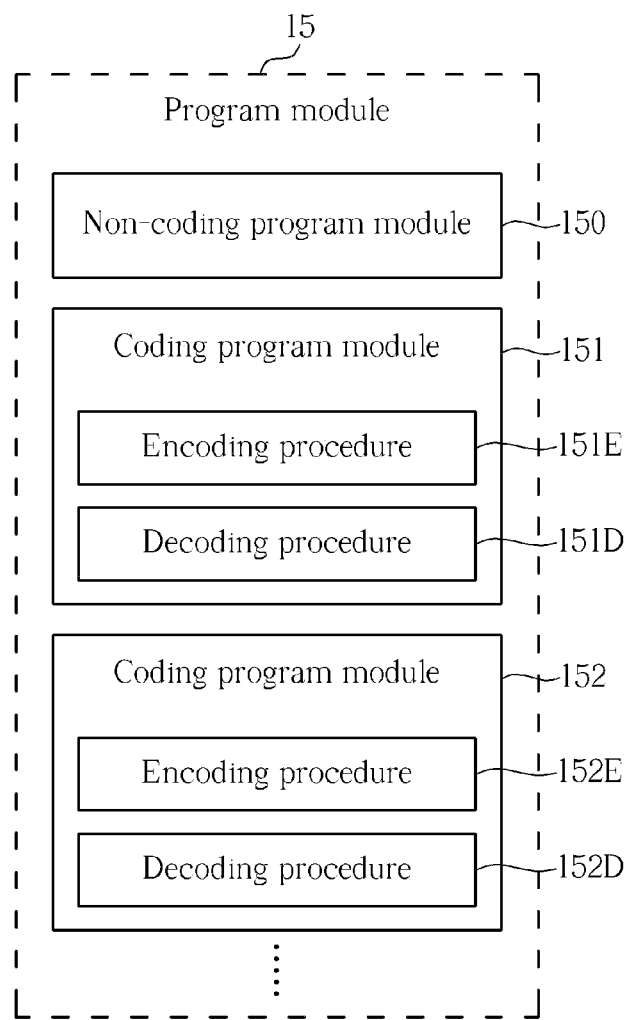
FIG. 1B illustrates some program modules involved with the processing circuit shown in FIG. 1A according to an embodiment of the present invention.

FIG. 1B illustrates some program modules involved with the processing circuit 100 shown in FIG. 1A according to an embodiment of the present invention. In this embodiment, the aforementioned at least one program module 15 comprises a non-coding program module 150 and a plurality of coding program modules 151, 152, ..., etc., where the plurality of coding program modules 151, 152, ..., etc. may comprise at least one encoding procedure and/or at least one decoding procedure. For example, each of at least one portion of the plurality of coding program modules 151, 152, ..., etc. (e.g. a portion or all of the coding program modules 151, 152, ..., etc.) may comprise an encoding procedure and a decoding procedure. More particularly, as shown in FIG. 1B, the coding program module 151 comprises an encoding procedure 151E and a decoding procedure 151D, and the coding program module 152 comprises an encoding procedure 152E and a decoding procedure 152D, and so on. In practice, the processor 110 can load and execute the non-coding program module 150 to control the operations of the processing circuit 100. When needed, the processor 110 can load and execute one or more of the coding program modules 151, 152, ..., etc. to perform one or more coding operations.

Based upon the architecture disclosed above, the processing circuit 100 can dynamically select the program module 15 (and more particularly, one of the coding program modules 151, 152, ..., etc.) or the hardware module 120, in order to achieve the best performance of coding operations. Some implementation details are further described according to FIG. 2.

Figure 2:
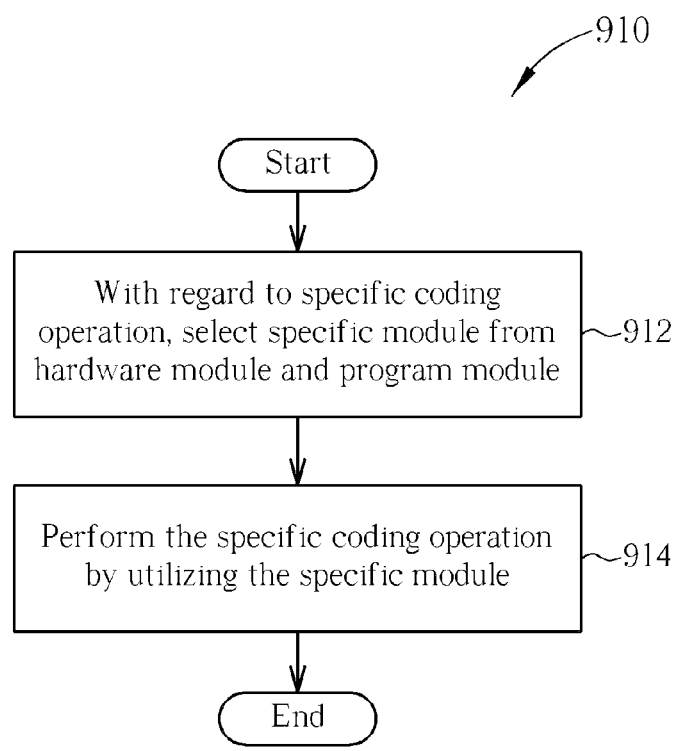
FIG. 2 is a flowchart of a method for performing coding resource management according to one embodiment of the present invention.

FIG. 2 is a flowchart of a method 910 for performing coding resource management according to one embodiment of the present invention. The method 910 shown in FIG. 2 can be applied to the processing circuit 100 shown in FIG. 1A. The method is described as follows.

In Step 912, with regard to a specific coding operation, such as that mentioned above, the aforementioned resource manager (e.g. the processor 110 in this embodiment) selects a specific module from the hardware module 120 and the program module 15. In particular, based upon at least one characteristic of the specific coding operation, the resource manager is capable of selecting the specific module from the hardware module 120 and the program module 15. For example, the specific coding operation can be the operation of one of hash coding algorithms such as Secure Hash Algorithm (SHA), Message-Digest algorithm 5 (MD5), ..., etc. or the like. In another example, the specific coding operation can be the operation of one of symmetric encryption standards such as Advanced Encryption Standard (AES), Data Encryption Standard (DES), ..., etc. or the like.

In Step 914, the processing circuit 100 performs the specific coding operation by utilizing the specific module, i.e. the specific module selected in Step 912 by the resource manager. For example, in a situation where the program module 15 is selected as the specific module, the processing circuit 100 utilizes the processor 110 executing the program module 15 (and more particularly, the processor 110 executing one of the coding program modules 151, 152, ..., etc.) to perform the specific coding operation. In another example, in a situation where the hardware module 120 is selected as the specific module, the processing circuit 100 utilizes the hardware module 120 to perform the specific coding operation.

Figure 3:
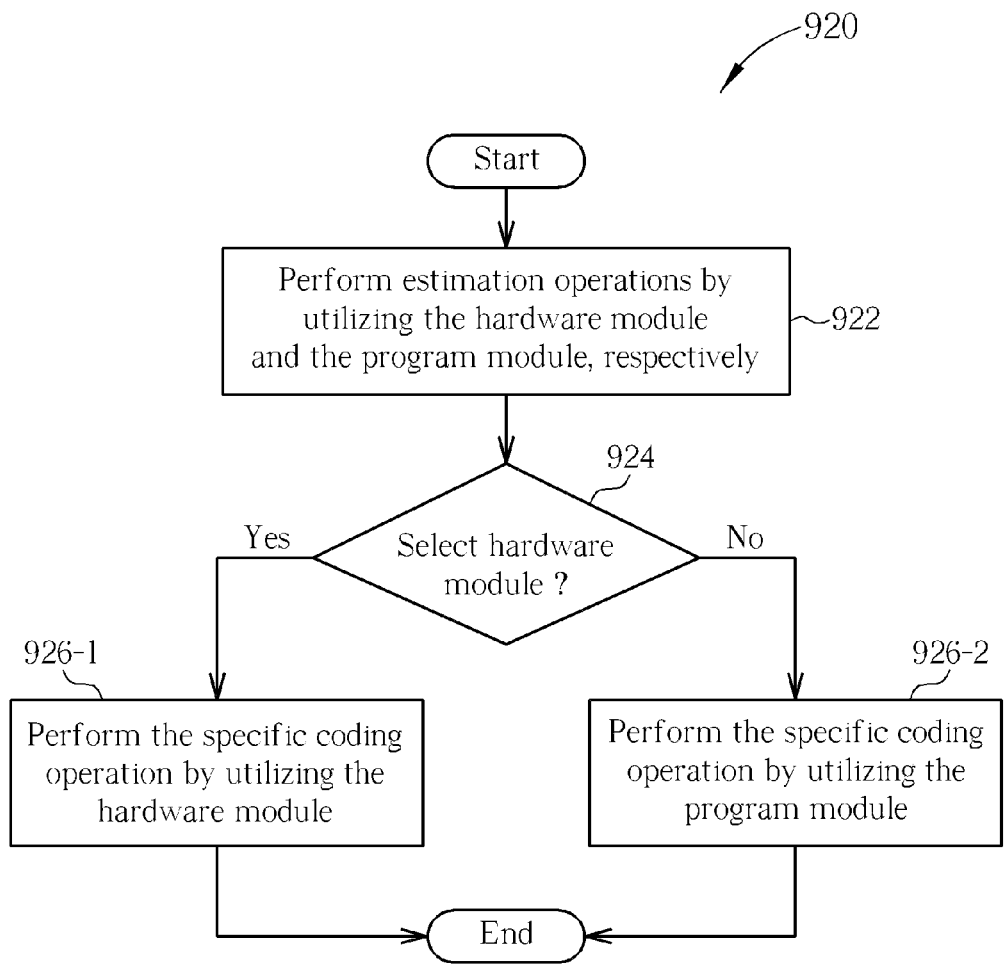
FIG. 3 illustrates implementation details of the method shown in FIG. 2 according to an embodiment of the present invention.

According to this embodiment, the aforementioned at least one characteristic may comprise at least one estimation result, where the processing circuit 100 performs estimation operations by utilizing the hardware module 120 and the program module 15, respectively, in order to obtain the at least one estimation result, and more particularly, to obtain the estimation results respectively corresponding to the hardware module 120 and the program module 15. For example, the estimation operations mentioned above can be implemented in the working flow 920 shown in FIG. 3, where the working flow 920 is described as follows.

In Step 922, the processing circuit 100 performs the estimation operations by utilizing the hardware module 120 and the program module 15, respectively. For example, the estimation operations can be similar to the specific coding operation. In another example, only a portion of the data involved with Step 914 is utilized during the estimation operations.

In Step 924, the aforementioned resource manager (e.g. the processor 110 in this embodiment) determines whether to select the hardware module 120 (or the program module 15) as the specific module. In particular, the aforementioned resource manager can compare the estimation results respectively corresponding to the hardware module 120 and the program module 15 (e.g. the estimated time of utilizing the hardware module 120 and the estimated time of utilizing the program module 15), and select the specific module from the hardware module 120 and the program module 15 accordingly. When it is determined that the hardware module 120 is selected as the specific module, Step 926-1 is entered; otherwise, Step 926-2 is entered.

In Step 926-1, the processing circuit 100 performs the specific coding operation by utilizing the hardware module 120.

In Step 926-2, the processing circuit 100 performs the specific coding operation by utilizing the program module 15.

Based upon the working flow 920 disclosed above, the processing circuit 100 can achieve the best performance of obtaining (or computing) the encoded/decoded results of the specific coding operation. This is for illustrative purposes only, and is not meant to be a limitation of the present invention. According to a variation of this embodiment, the working flow 920 is not required. In particular, the aforementioned at least one characteristic may comprise classification of the specific coding operation, where the processing circuit 100 may store classification information that represents the classification of the specific coding operation. For example, the processing circuit 100 of this variation can store the classification information in the buffer 130 or some registers within the processing circuit 100, and the aforementioned resource manager can select the specific module from the hardware module 120 and the program module 15 accordingly. According to other variations of this embodiment, based upon default settings and/or user settings, the resource manager is capable of selecting the specific module from the hardware module 120 and the program module 15. In practice, the default settings and/or the user settings may carry information representing the aforementioned at least one characteristic of the specific coding operation.

According to an embodiment (e.g. one of the variations mentioned above), based upon default settings and/or user settings for different types of coding operations, the resource manager can determine whether it requires only a single command to accomplish the specific coding operation. When it is determined that it requires only the single command to accomplish the specific coding operation, the resource manager selects the hardware module 120 as the specific module; otherwise, the resource manager selects the program module 15 (and more particularly, one of the coding program modules 151, 152, . . . , etc.) as the specific module.

For example, in a situation where the specific coding operation is the operation of one of the aforementioned hash coding algorithms such as SHA, MD5, . . . , etc. or the like, when the specific coding operation is to be applied to a whole of the data under processing, which typically means that only a single command is required for accomplishing the specific coding operation, it can be concluded from some experimental results that utilizing the hardware module 120 will achieve better performance than that of utilizing the program module 15. On the contrary, in a situation where the specific coding operation is the operation of one of the aforementioned hash coding algorithms such as SHA, MD5, . . . , etc. or the like, when the specific coding operation is to be applied to the data under processing piece by piece, which typically means that many commands are required for accomplishing the specific coding operation, it can be concluded from some experimental results that utilizing the program module 15 will achieve better performance than that of utilizing the hardware module 120.

In another example, in a situation where the specific coding operation is the operation of one of the aforementioned symmetric encryption standards such as AES, DES, . . . , etc. or the like, when the specific coding operation is to be applied to a whole of the data under processing (e.g. the specific coding operation corresponds to a Cipher Block Chaining (CBC) coding mode), which typically means that only a single command is required for accomplishing the specific coding operation, it can be concluded from some experimental results that utilizing the hardware module 120 will achieve better performance than that of utilizing the program module 15. On the contrary, in a situation where the specific coding operation is the operation of one of the aforementioned symmetric encryption standards such as AES, DES, . . . , etc. or the like, when the specific coding operation is to be applied to the data under processing piece by piece (e.g. the specific coding operation corresponds to an Electronic Code Block (ECB) coding mode), which typically means that many commands are required for accomplishing the specific coding operation, it can be concluded from some experimental results that utilizing the program module 15 will achieve better performance than that of utilizing the hardware module 120.

According to a variation of this embodiment, based upon the default settings and/or the user settings for the aforementioned different types of coding operations, the resource manager can determine whether the number of commands for accomplishing the specific coding operation reaches a predetermined value (e.g. a natural number that is greater than one). When it is determined that the number of commands for accomplishing the specific coding operation reaches the predetermined value, the resource manager selects the program module 15 (and more particularly, one of the coding program modules 151, 152, . . . , etc.) as the specific module; otherwise, the resource manager selects the hardware module 120 as the specific module. Similar descriptions for this variation are not repeated in detail here.

Figure 4:
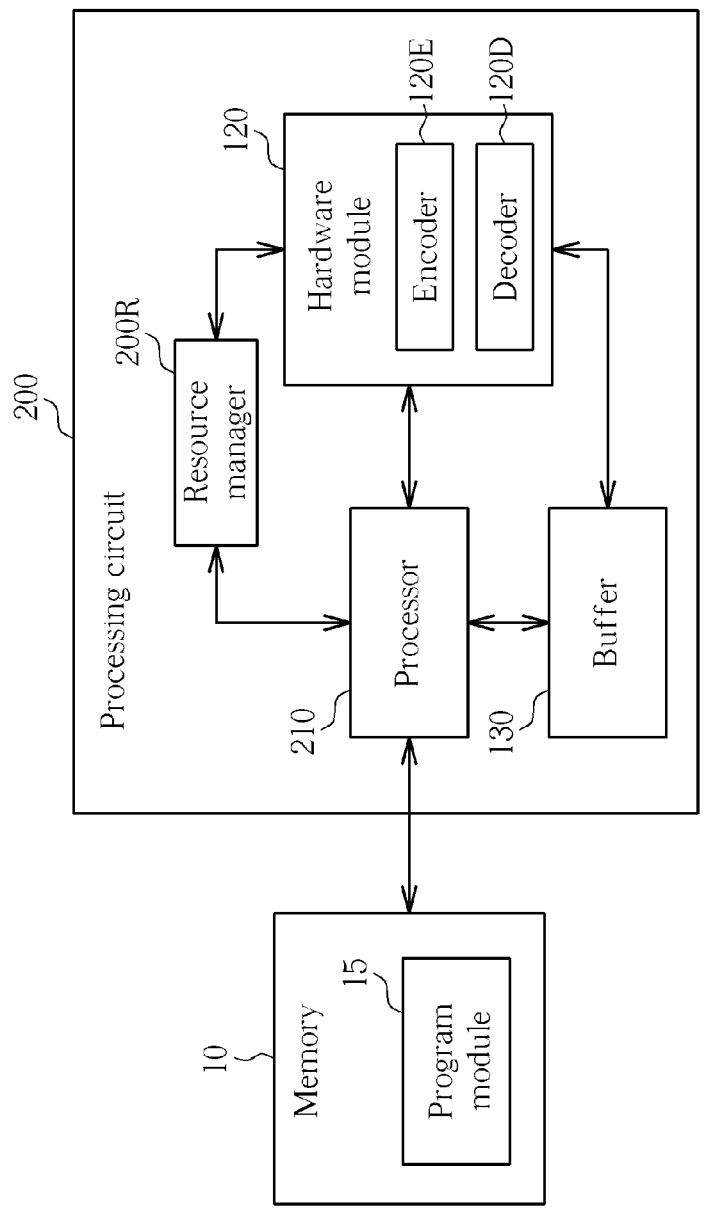
FIG. 4 is a diagram of a processing circuit coupled to a storage such as the memory mentioned above according to a second embodiment of the present invention.

FIG. 4 is a diagram of a processing circuit 200 coupled to a storage such as the memory 10 mentioned above according to a second embodiment of the present invention. The differences between the first and the second embodiments can be described as follows.

As shown in FIG. 4, the processor 110 mentioned above is replaced by a processor 210, and the aforementioned resource manager is implemented as an individual component, i.e. the resource manager 200R, rather than the processor 210 arranged to control operations of the processing circuit 200. In particular, the resource manager 200R is arranged to execute Step 912 shown in FIG. 2. More specifically, with regard to the specific coding operation mentioned above, the resource manager 200R selects the aforementioned specific module from the hardware module 120 and the program module 15. Thus, the processing circuit 200 performs the specific coding operation by utilizing the specific module selected by the resource manager 200R. For example, in a situation where the program module 15 is selected as the specific module, the processing circuit 200 utilizes the processor 210 executing the program module 15 (and more particularly, one of the coding program modules 151, 152, . . . , etc.) to perform the specific coding operation. In another example, in a situation where the hardware module 120 is selected as the specific module, the processing circuit 200 utilizes the hardware module 120 to perform the specific coding operation. Similar descriptions for this embodiment are not repeated in detail here.

Please note that the processing circuit 200 can obtain the program module 15 from the aforementioned storage (e.g. the memory 10) outside the processing circuit 200. This is for illustrative purposes only, and is not meant to be a limitation of the present invention. According to a variation of this embodiment, the processing circuit 200 may comprise a memory arranged to store the program module 15. For example, the memory arranged to store the program module 15 in this variation can be a ROM such as an EEPROM.

It is an advantage of the present invention that, when it is required for an electronic device such as a mobile phone, a personal digital assistant (PDA), an entertainment device, an optical storage device, . . . , etc. to perform data coding (e.g. data encoding and/or data decoding), as long as the electronic device is equipped with the processing circuit of any of the embodiments/variations disclosed above, the performance of the electronic device can be optimized. In contrast to the related art, as long as the electronic device is equipped with the processing circuit of any of the embodiments/variations disclosed above, failing to achieve the best overall performance of the electronic device is no longer an issue since which kind of coding resource (e.g. the hardware module, or the processor executing the program module) should be utilized for obtaining coding results such as encoded/decoded results can be dynamically determined with ease.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for performing coding resource management, the method being applied to a processing circuit, the method comprising:
with regard to a specific coding operation, selecting a specific module from a hardware module and a program module; and
performing the specific coding operation by utilizing the specific module;
determining whether the specific coding operation corresponds to a Cipher Block Chaining (CBC) coding mode or to an Electronic Code Block (ECB) coding mode;
when it is determined that the specific coding operation corresponds to the Cipher Block Chaining (CBC) coding mode, selecting the hardware module as the specific module; and
when it is determined that the specific coding operation corresponds to the Electronic Code Block (ECB) coding mode, selecting the program module as the specific module;
wherein the specific coding operation is symmetric encryption standard.

2. The method of claim 1, wherein the hardware module comprises an encoder and/or a decoder.

3. The method of claim 1, wherein the program module comprises an encoding procedure and/or a decoding procedure.

4. The method of claim 1, wherein in a situation where the program module is selected as the specific module, the step of performing the specific coding operation by utilizing the specific module further comprises:
utilizing a processor executing the program module to perform the specific coding operation.

5. The method of claim 4, wherein the processor is arranged to control operations of the processing circuit.

6. The method of claim 1, wherein the step of selecting the specific module from the hardware module and the program module further comprises:
based upon at least one characteristic of the specific coding operation, selecting the specific module from the hardware module and the program module.

7. The method of claim 6, wherein the at least one characteristic comprises classification of the specific coding operation; and the method further comprises:
storing classification information that represents the classification of the specific coding operation.

8. The method of claim 6, wherein the at least one characteristic comprises at least one estimation result; and the method further comprises:
performing estimation operations by utilizing the hardware module and the program module, respectively, in order to obtain the at least one estimation result.

9. A processing circuit, comprising:
at least one hardware module arranged to perform at least one coding operation when needed; and
a resource manager arranged to perform coding resource management, wherein with regard to a specific coding operation, the resource manager selects a specific module from the hardware module and a program module;
wherein the resource manager determines whether the specific coding operation corresponds to a Cipher Block Chaining (CBC) coding mode or to an Electronic Code Block (ECB) coding mode; when it is determined that the specific coding operation corresponds to the Cipher Block Chaining (CBC) coding mode, the resource manager selects the hardware module as the specific module; and when it is determined that the specific coding operation corresponds to the Electronic Code Block (ECB) coding mode, the resource manager selects the program module as the specific module;
wherein the processing circuit performs the specific coding operation by utilizing the specific module, and wherein the specific coding operation is symmetric encryption standard.

10. The processing circuit of claim 9, wherein the hardware module comprises an encoder and/or a decoder.

11. The processing circuit of claim 9, wherein the program module comprises an encoding procedure and/or a decoding procedure.

12. The processing circuit of claim 9, wherein the resource manager is a processor arranged to control operations of the processing circuit; and in a situation where the program module is selected as the specific module, the processing circuit utilizes the processor executing the program module to perform the specific coding operation.

13. The processing circuit of claim 9, further comprising:
a processor arranged to control operations of the processing circuit;
wherein in a situation where the program module is selected as the specific module, the processing circuit utilizes the processor executing the program module to perform the specific coding operation.

14. The processing circuit of claim 9, wherein the processing circuit obtains the program module from a storage outside the processing circuit.

15. The processing circuit of claim 9, further comprising:
A memory arranged to store the program module.

16. The processing circuit of claim 9, wherein based upon at least one characteristic of the specific coding operation, the resource manager selects the specific module from the hardware module and program module.

17. The processing circuit of claim 16, wherein the at least one characteristic comprises classification of the specific coding operation; and the processing circuit stores classification information that represents the classification of the specific coding operation.

18. The processing circuit of claim 16, wherein the at least one characteristic comprises at least one estimation result; and the processing circuit performs estimation operations by utilizing the hardware module and the program module, respectively, in order to obtain the at least one estimation result.

* * * * *